US012718117B2

(12) United States Patent
Subramanian et al.

(10) Patent No.: US 12,718,117 B2
(45) Date of Patent: Aug. 25, 2026

(54) DISTRIBUTED COMPUTING FOR DYNAMIC GENERATION OF OPTIMAL AND INTERPRETABLE PRESCRIPTIVE POLICIES WITH INTERDEPENDENT CONSTRAINTS

(71) Applicant: INTERNATIONAL BUSINESS MACHINES CORPORATION, Armonk, NY (US)

(72) Inventors: Shivaram Subramanian, Frisco, TX (US); Wei Sun, Scarsdale, NY (US); Markus Ettl, Yorktown Heights, NY (US); Youssef Drissi, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 17/509,012

(22) Filed: Oct. 24, 2021

(65) Prior Publication Data

US 2023/0128532 A1 Apr. 27, 2023

(51) Int. Cl.
*G06N 5/025* (2023.01)
*G06N 5/045* (2023.01)

(52) U.S. Cl.
CPC ............ *G06N 5/025* (2013.01); *G06N 5/045* (2013.01)

(58) Field of Classification Search
CPC .............................. G06N 5/025; G06N 5/045
See application file for complete search history.

(56) References Cited

U.S. PATENT DOCUMENTS

| | | | |
|---|---|---|---|
| 5,787,274 | A | 7/1998 | Agrawal et al. |
| 6,314,361 | B1 | 11/2001 | Yu et al. |
| 7,474,995 | B2 | 1/2009 | Masiello et al. |

(Continued)

FOREIGN PATENT DOCUMENTS

| | | | |
|---|---|---|---|
| CN | 106611180 | A | 5/2017 |
| CN | 107516104 | A | 12/2017 |

(Continued)

OTHER PUBLICATIONS

Bezrutczyk, Destiny, "History of Cancer Treatment", Apr. 20, 2021, mesotheliomahub.com (Year: 2024).*

(Continued)

*Primary Examiner* — Haimei Jiang
*Assistant Examiner* — Thomas Bernard Lane
(74) *Attorney, Agent, or Firm* — CHIP LAW GROUP

(57) ABSTRACT

A computer-implemented method of generating an Artificial Intelligence (AI) driven prescriptive policy and executing a function includes obtaining interdependent operational information about the function. A model is trained with the interdependent operational information about the function to dynamically generate a plurality of candidate decision paths from a group of all feasible decision paths for a plurality of interrule logical conditions and one or more dynamic constraints of the operational information. A prescriptive policy is generated from the plurality of candidate decision paths to execute the function that satisfies to a threshold degree of confidence the interrule logical conditions and the one or more dynamic constraints of the operational information. The function is executed based on the generated prescriptive policy.

18 Claims, 9 Drawing Sheets

(56) References Cited

U.S. PATENT DOCUMENTS

| | | | |
|---|---|---|---|
| 7,818,244 B1 | 10/2010 | Dharan et al. | |
| 8,417,654 B1 | 4/2013 | Cao et al. | |
| 8,949,158 B2 | 2/2015 | Borthwick et al. | |
| 9,684,874 B2 | 6/2017 | Cichosz et al. | |
| 10,452,992 B2 | 10/2019 | Lee et al. | |
| 11,100,421 B2 | 8/2021 | Kucera | |
| 2015/0302317 A1 | 10/2015 | Norouzi et al. | |
| 2015/0370228 A1 | 12/2015 | Kohn et al. | |
| 2018/0157987 A1 | 6/2018 | Schmidt-Karaca | |
| 2018/0158552 A1 | 6/2018 | Liu et al. | |
| 2019/0102681 A1 | 4/2019 | Roberts et al. | |
| 2019/0156227 A1 | 5/2019 | Duke et al. | |
| 2019/0213685 A1 | 7/2019 | Ironside | |
| 2019/0279096 A1* | 9/2019 | de Nijs | G06F 16/951 |
| 2019/0287515 A1 | 9/2019 | Li et al. | |
| 2020/0110982 A1 | 4/2020 | Gou et al. | |
| 2020/0226476 A1 | 7/2020 | Wang et al. | |
| 2020/0227134 A1 | 7/2020 | Kazemi et al. | |
| 2020/0302318 A1 | 9/2020 | Hetherington et al. | |
| 2020/0334538 A1 | 10/2020 | Meng et al. | |
| 2020/0380380 A1 | 12/2020 | Ramachandran et al. | |
| 2021/0027315 A1 | 1/2021 | Nanavati et al. | |
| 2021/0142253 A1 | 5/2021 | Cohen et al. | |
| 2021/0174264 A1 | 6/2021 | Jordan et al. | |
| 2021/0247744 A1* | 8/2021 | Fahrenkopf | G06N 3/08 |
| 2021/0390417 A1 | 12/2021 | Shahrzad et al. | |
| 2022/0180168 A1 | 6/2022 | Biggs et al. | |
| 2022/0188648 A1 | 6/2022 | Shi et al. | |
| 2023/0289623 A1 | 9/2023 | Zhang et al. | |
| 2024/0070476 A1 | 2/2024 | Subramanian et al. | |
| 2024/0330745 A1 | 10/2024 | Subramanian et al. | |

FOREIGN PATENT DOCUMENTS

| | | |
|---|---|---|
| CN | 107766883 A | 3/2018 |
| CN | 113256409 A | 8/2021 |
| CN | 113946861 A | 1/2022 |
| TW | I818669 B | 10/2023 |
| WO | 02/29612 A1 | 4/2002 |
| WO | 2016/004073 A1 | 1/2016 |
| WO | 2019/088972 A1 | 5/2019 |
| WO | 2020230137 A1 | 11/2020 |
| WO | 2023/066073 A1 | 4/2023 |

OTHER PUBLICATIONS

Amram, Maxime et al. "Optimal Policy Trees", Dec. 3, 2020, arXiv, pp. 1-24 (Year: 2020).*

Mell, P. et al., "Recommendations of the National Institute of Standards and Technology"; NIST Special Publication 800-145 (2011); 7 pgs.

Aghaei, S. et al., "Learning Optimal Classification Trees: Strong Max-Flow Formulations"; arXiv:2002.09142v2 [stat.ML] (2020); 34 pgs.

Amram, M. et al., "Optimal Policy Trees"; arXiv:2012.02279v1 [cs.LG] (2020); 24 pgs.

Bertsimas, D. et al., "Optimal Prescriptive Trees"; Informs Journal of Optimization (2019); vol. 1:2; pp. 164-183.

Elmachtoub, A. N. et al., Smart "Predict, then Optimize"; airXiv:1710.08005v5 [math.OC] (2020); 46 pgs.

Elmachtoub, A. N. et al., "Decision Trees for Decision-Making under the Predict-then-Optimize Framework"; Proceedings of the 37 th International Conference on Machine Learning, Online (PMLR 2020); 10 pgs.

Firat, M. et al., "Constructing Classication Trees Using Column Generation"; arXiv:1810.06684v1 [cs.LG] (2018); 29 pgs.

Bertsimas, D. et al., "Optimal Classification Trees"; Machine Learning (2017), vol. 106:7; pp. 1039-1082.

Bertsimas, D. et al., "From Predictive to Prescriptive Analytics"; Informs Management Science (2020); vol. 66:3; pp. 1025-1044.

Penberthy, J. S. et al., "Prescriptive Multiway-Split Trees with Constraints via Dynamic Column Generation"; Association for the Advancement of Artificial (Publication date unknown); 7 pgs.

Gusher, T. et al., "Living in an AI World 2020 Retail Insiders" KMPG (2020); 8 pgs.

Aghaei, S. et al., "Learning Optimal and Fair Decision Trees for Non-Discriminative Decision-Making", Association for the Advancement of Artificial Intelligence (2019), 9 pgs.

Aghaei, S. et al., "Strong Optimal Classification Trees", arXiv:2103.15965v1 [cs.LG] (2021), 54 pgs.

Athey, S, et al., "Recursive partitioning for heterogeneous causal effects", Proceedings of the National Academy of Sciences, Jul. 5, 2016, pp. 7353-7360, v. 113, No. 27, United States.

Bastani et al, "Interpreting black box models via model extraction." arXiv preprint arXiv: 1705.08504 (2017). (Year: 2017).

Biggs, M. et al., "Model Distillation for Revenue Optimization: Interpretable Personalized Pricing", Proceedings of the 38th International Conference on Machine Learning, PMLR 139 (2021), 11 pgs.

Bodea, T. et al., "Segmentation, Revenue Management and Pricing Analytics", Taylor & Francis Group (2014), 1st edition, New York, NY, Table of Contents, 2 pgs. https://doi.org.

Che et al. "Distilling knowledge from deep networks with applications to healthcare domain." arXiv preprint arXiv:1512.03542 (2015). (Year: 2015).

Frosst et al. "Distilling a neural network into a soft decision tree." arXiv preprint arXiv: 1711.09784 (2017). (Year: 2017).

Gao et al, "Healthcare Supply Chain Network Coordination Through Medical Insurance Strategies with Reference Price Effect". Int J Environ Res Public Health. Sep. 18, 2019;16(18):3479. doi: 10.3390/ijerph16183479 (Year: 2019).

Gonlok, O., et al., "Optimal decision trees for categorical data via integer programming", Journal of Global Optimization, 2021, pp. 233-260, https://doi.org/10.1007/s10898-021-01009-y, Springer, United States.

Kallus, N. "Recursive partitioning for personalization using observational data", In Proceedings of the 34th International Conference on Machine Learning, 2017, pp. 1789-1798, vol. 70. JMLR. org, United States.

Khan et al., "Federated Learning for Edge Networks: Resource Optimization and Incentive Mechanism," in IEEE Communications Magazine, vol. 58, No. 10, pp. 88-93, Oct. 2020, doi: 10.1109/MCOM.001.1900649 (Year: 2020).

Liu et al, "Improving the Interpretability of Deep Neural Networks with Knowledge Distillation." arXiv preprint arXiv: 1812.10924 (2018) (Year: 2018).

Payabvash, S. et al., "Machine Learning Decision Tree Models for Differentiation of Posterior Fossa Tumors Using Diffusion Histogram Analysis and Structural MRI Findings", Frontiers in Oncology (2020); vol. 10:71, 15 pgs.

Penberthy, J. et al., "Prescriptive Multiway-Split Trees with Contraints via Dynamic Column Generation", AAAI (2022); 7 pgs.

Subramanian, S. et al., "Constrained Prescriptive Trees via Column Generation", Association for the Advancement of Artificial Intelligence (2022), 21 pgs.

Taiwanese Office Action dated May 8, 2023 for Taiwan Patent Application No. 11130332, from the Taiwan Intellectual Property Office, pp. 1-8, Taiwan (R.O.C) [An English translation is not readily available].

United States Final Rejection dated Oct. 31, 2024, 28 pages, U.S. Appl. No. 17/111,212.

United States Non-Final Rejection dated Mar. 27, 2024, 32 pages, U.S. Appl. No. 17/111,212.

Wu et al. "Beyond Sparsity: Tree Regularization of Deep Models for Interpretability." arXiv preprint arXiv:1711.06178 (2017). (Year: 2017).

Yu, C. et al., "Predicting Metabolic Syndrome With Machine Learning Models Using a Decision Tree Algorithm Retrospective Cohort Study", JMIR Med Inform (2020); vol. 8:3, 17 pgs.

Zhu, H. et al., "A Scalable MIP-Based Method for Learning Optimal Multivariate Decision Trees", 34th Conference on Neural Information Processing Systems (NeurIPS 2020), 11 pgs.

Zhu, Y. et al., "Co-Clustering Based Dual Prediction for Cargo Pricing Optimization", ACM SIGKDD (2020), 10 pgs.

International Search Report and Written Opinion issued Dec. 22, 2022 in related application No. PCT/CN2022/124478, 9 pgs.

(56) References Cited

OTHER PUBLICATIONS

Hinton et al. "Distilling the Knowledge in a Neural Network," arXiv:1503.02531v1 [stat.ML] Mar. 9, 2015, 9 pages.
Liu, et al., Improving the Interpretability of Deep Neural Networks with Knowledge Distillation, arXiv:1812.10924v1 [cs.LG] Dec. 28, 2018, 8 pages.
Berzal, et al., Building Multi-way Decision Trees With Numerical Attributes, Information Sciences, vol. 165, Issues 1-2, Sep. 3, 2004, pp. 73-90.
United States, Non-Final Office Action, dated Aug. 13, 2025, 30 pages, U.S. Appl. No. 17/899,534
Taiwan Patent Office, "Notice of Allowance," Aug. 22, 2023, 9 Pages, TW Application No. 11130332.
United States Final Rejection dated Dec. 10, 2025, 41 pages, in U.S. Appl. No. 17/111,212.
Fulton et al. "Efficient algorithms for finding multi-way splits for decision trees", In Machine Learning Proceedings, Jan. 1, 1995, pp. 244-251.
Liu et al. "A Robust Decision Tree Algorithm for Imbalanced Data Sets", Proceedings of the 2010 SIAM International Conference on Data Mining, 2010, pp. 766-777.
Mern et al. "Interpretable Local Tree Surrogate Policies", arXiv preprint arXiv:2109.08180, Sep. 16, 2021, 8 pages.
United States Non-Final Rejection dated Mar. 10, 2026, 48 pages, in U.S. Appl. No. 17/899,534.

* cited by examiner

DISTRIBUTED COMPUTING FOR DYNAMIC GENERATION OF OPTIMAL AND INTERPRETABLE PRESCRIPTIVE POLICIES WITH INTERDEPENDENT CONSTRAINTS

BACKGROUND

Technical Field

The present disclosure generally relates to prescriptive models for decision making, and more particularly, to distributed computing for generating prescriptive models with constraints.

Description of the Related Art

With an abundance of available data, there is an increased interest in data-driven analytics to help make better decisions. Prescriptive analysis seeks to determine a best action, outcome, or solution from among a plurality of choices. Such prescriptive analysis is based on an outcome of a predictive model to determine a best course of action.

SUMMARY

In one embodiment, a computer-implemented method of generating an Artificial Intelligence (AI) driven prescriptive policy and executing a function includes obtaining interdependent operational information about the function. A model is trained with the interdependent operational information about the function to dynamically generate a plurality of decision paths for a plurality of interrule logical conditions and one or more dynamic constraints of the operational information. A prescriptive policy is generated to execute the function that satisfies to a threshold degree of confidence the interrule logical conditions and the one or more dynamic constraints of the operational information. The function is executed based on the generated prescriptive policy.

In an embodiment, training the model further includes selectively combining at least some of the dynamically generated decision paths to generate the prescriptive policy.

In an embodiment, the prescriptive policy includes interpretable prescriptive decisions that satisfy attribute-combination, cross-rules, and global capacity constraints.

In an embodiment, generating the prescriptive policy further includes applying a mixed-integer program (MIP) formulation to analyze the operational information and identify a particular policy via dynamic column generation.

In an embodiment, generating the prescriptive policy includes generating a personalized medicine policy. Executing the function provides a dosage recommendation for a medical treatment.

In an embodiment, the model is an opaque predictive counterfactual estimation model configured to predict a probability of success.

In an embodiment, the model includes a teacher model and a student model. The method further includes training the teacher model to predict counterfactual outcomes associated with different actions.

In an embodiment, the training of the student model is performed with the teacher model to determine a best policy with respect to a given objective.

In an embodiment, the student model includes a multi-way-split tree (MST), wherein a node includes two or more children nodes.

In an embodiment, mapping each prescribed rule to a distinct and independent path in a graph.

In one embodiment, the computing device is configured to generate an Artificial Intelligence (AI) driven prescriptive policy and to execute a function related to the prescriptive policy. The computing device includes a processor and a memory coupled to the processor. The memory stores instructions to cause the processor to perform acts including obtaining interdependent operational information about a function. A model is trained with the interdependent operational information about the function. The model is applied using distributed computing to dynamically generate a plurality of candidate decision paths from a group of all feasible decision paths for a plurality of interrule logical conditions and one or more dynamic constraints of the operational information. A prescriptive policy is thereafter selected from the plurality of candidate decision paths to execute the function that satisfies to a threshold degree of confidence the interrule logical conditions and the one or more dynamic constraints of the operational information, and the function is executed based on the generated prescriptive policy.

In one embodiment, a non-transitory computer readable storage medium tangibly embodying a computer readable program code having computer readable instructions that, when executed, causes a computer device to carry out a method of generating an Artificial Intelligence (AI) driven prescriptive policy and execute a function, the method includes obtaining interdependent operational information about a function. A model is trained with the interdependent operational information about the function to dynamically generate a plurality of decision paths for a plurality of interrule logical conditions and one or more dynamic constraints of the operational information. A prescriptive policy is generated to execute the function that satisfies the interrule logical conditions and the one or more dynamic constraints of the operational information, and the function is executed based on the generated prescriptive policy.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
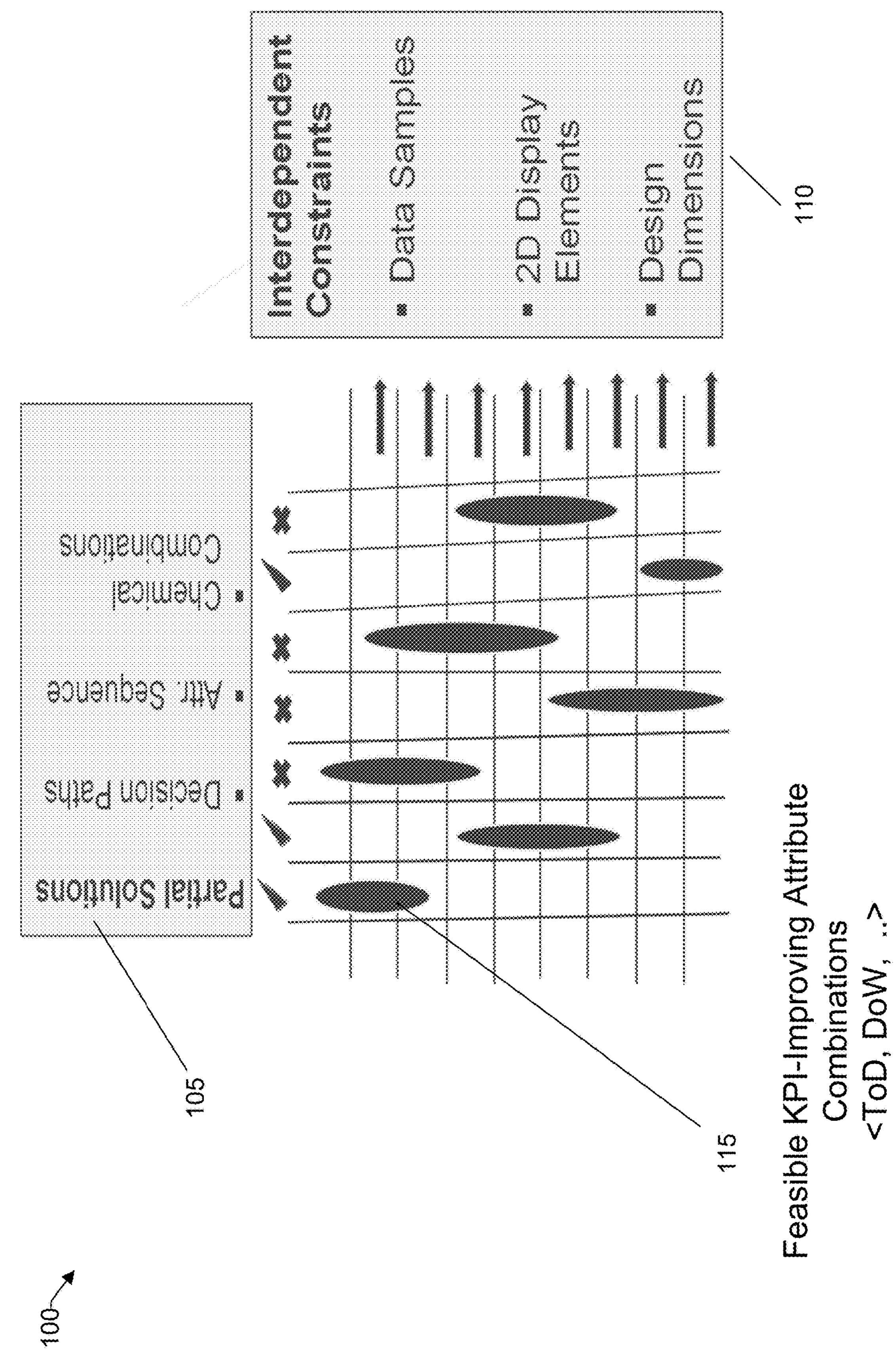
FIG. 1 is an illustration of applications of a dynamic AI-driven policy generation and distributed optimization, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

As used herein, the term "success" in a healthcare setting is to be interpreted broadly. For example, success can be defined as a 5-year survival rate for patients with cancer/chronic diseases, or a certain recovery rate for a particular disease, or not returning to an emergency room with a certain time frame, or not having certain side effects. An objective may include maximizing a probability of success given patient covariates by optimizing the treatment.

As used herein in, the term "success" in a customer relationship management (CRM) setting is to be interpreted broadly. For example, with regard to compliance management, "success" can be defined as a customer being satisfied by a solution that has been provided in response to a complaint. As different compensation strategies come with different costs, an objective is to choose the most cost-effective solution with respect to the severity of a complaint.

Prescriptive analytics uses the outcome of a prediction model to determine a best course of action. For example, prescriptive analysis can be used in healthcare to prescribe personalized medicine and/or a personalized course of treatment. As disclosed herein, prescriptive policies satisfy operational constraints and can eliminate rule conflicts in a proactive manner. According to an embodiment of the present disclosure, a teacher model is trained to accurately predict counterfactual outcomes that are associated wither various actions. The teacher model is used to drive the student model to determine a best course with respect to a given objective. The student model can include a multiway-split tree (MST) in which a node may have more than two children nodes. A prescribed rule in a policy corresponds to a set of features specified in a path from a root node to a leaf node in a tree. To construct a student tree, a path-based mixed-integer program (MIP) formulation is used, where each of the rules is mapped to a distinct path in a graph. Dynamic column generation can be used when the cardinality of paths becomes prohibitive for a large graph.

In a case where there is a large number of possible decision paths in a feature graph derived from a training dataset, e.g., 10 billion. Distributed computing is used to iteratively and efficiently implement an AI-guided search within the feature graph to identify, for example, the best 1000 or 10,000 candidates from this massively large pool. Then, from the 1000 or 10,000 candidates, a reduction (using MIP solvers) is performed to generate a final number (e.g., 50 or 100) of best decision policies that combine without conflicts to satisfy all the real-life constraints applied. The best decision policies are likely to realize more improved results in operations (live testing) that accurately match the predicted impact of these decisions. Without good quality policies that also satisfy constraints, the realized gains (if any) from the prescribed actions are poor and far away from what the teacher model predicts.

A difference between prescriptive analytics and predictive analytics is that in predictive the training and test data sets are similar (e.g., stationary) as nothing is changed. However, in prescriptive analytics, policies are generated that prescribe new (counterfactual) actions that are extrapolatory and possibly not seen in the training data (e.g., a new covid vaccine for a patient group that never received it before). Consequently, these decisions must satisfy different constraints to ensure that these extrapolated predictions of the outcomes of these decisions are realized in live testing.

The embodiments of the computer-implemented method and system of the present disclosure provide for an improvement in the field of prescriptive analysis, as more accurate decisions can be made based on analyzing the predicted model while taking into consideration constraints and interdependencies such as meta-rules. In addition, there is an improvement in computer operations, as the computer-implemented method and system according to the present disclosure reduces the amount of processing power used to achieve the prescriptive analysis results with reduced storage usage, and the results have increased accuracy.

Additional advantages of the present architecture are disclosed herein.

Example Embodiments

FIG. 1 is an illustration 100 of applications of a dynamic AI-driven policy generation and distributed optimization, consistent with an illustrative embodiment. There are partial solutions 105 that can include decision paths, sequences, and chemical combinations. Also shown are interdependent constraints 110 including data samples, 2D display elements, and design dimensions. For example, in an example of computational creativity, chemical combinations include a dynamic generation for feasible chemical compounds (e.g., partial solutions) and combining chemical compounds to produce an entire product that meets complex design specifications. With regard to chemical combinations, there are changes in pH, toxicity, etc., in a complex nonlinear way with permissible limits. A global design cost can be minimized while ensuring aggregated factors across compounds are below regulatory limits. In addition, cross-compound conflicts can be avoided. In the case of medical treatment, blackbox AI models are used to predict effectiveness, given demographics, patient attributes, and therapy attributes. Optimal prescriptive rules can maximize treatment success while minimizing rule complexity, therapy side effects, and total cost. At 115, there is identified a key performance indicator (KPI) improving attribute combinations.

Figure 2:
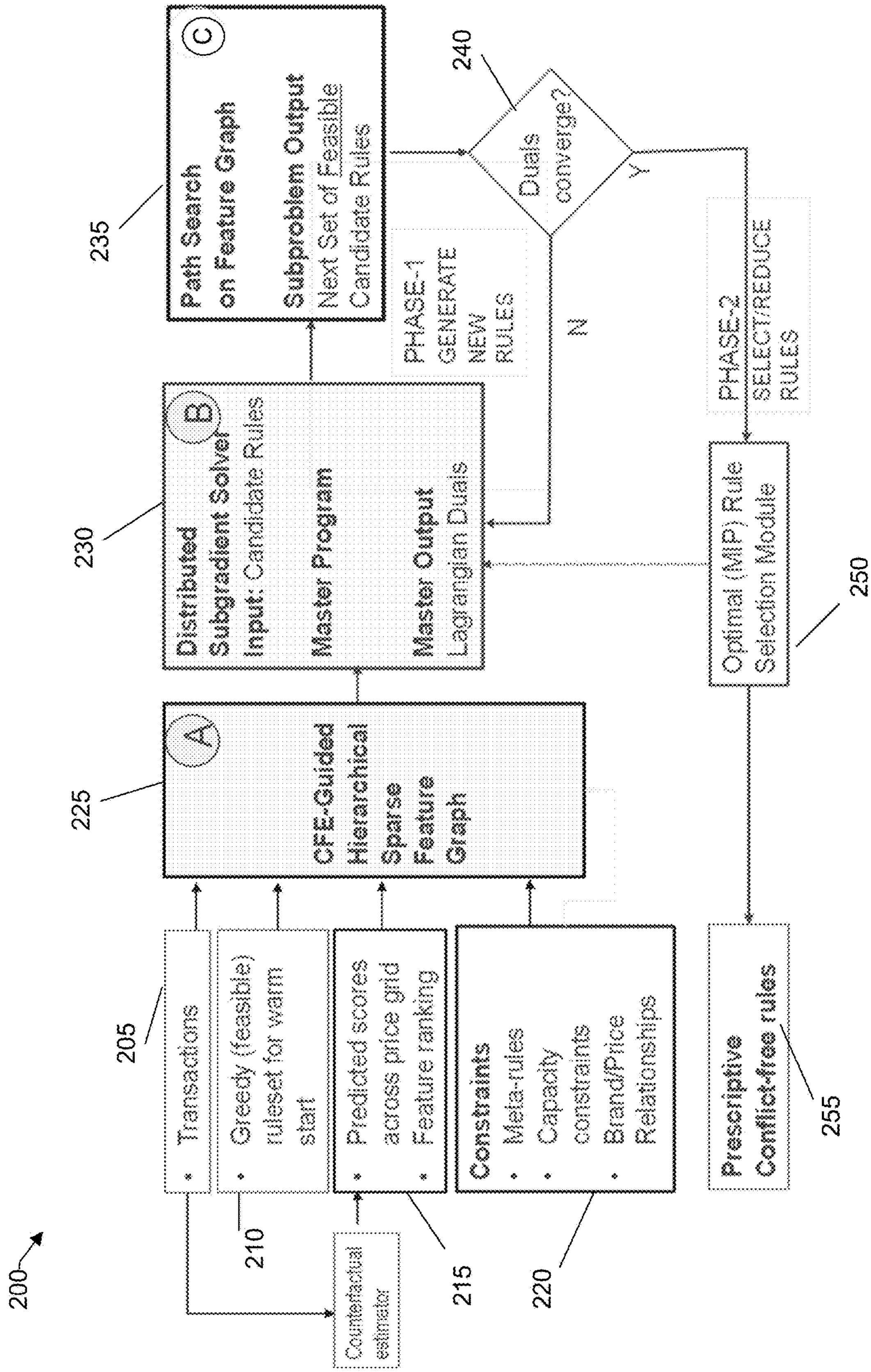
FIG. 2 is a flow diagram of a distributed computing base rule-generation and selection system, consistent with an illustrative embodiment.

FIG. 2 is a flow diagram 200 of a distributed computing-based rule-generation and selection system, consistent with an illustrative embodiment. There are three operations labeled A (Hierarchical Sparse Feature Graph 225), B (Distributed subgradient solver Input 230) including a master program and master output functions, and C (Path search on Feature Graph 235) in which there is a subproblem output and the next set of feasible candidate rules are output. New rules can be generated. The inputs to the Hierarchical Sparse feature graph include the transactions 205, a greedy result for a warm start 210, predicted scores 215 across a price grid (if applicable) and constraints 220 that can include meta-rules, capacity constraints, and/or brand/price relationships. At 240 a computing device determines whether Lagrangian duals converge. If affirmative, an optimal MIP rule selection module 250 is received to output prescriptive conflict-free rules. Lagrangian duality refers to a way to solve an optimization problem (e.g., a primal problem) by looking at a different optimization problem (e.g., a dual problem).

Figure 3:
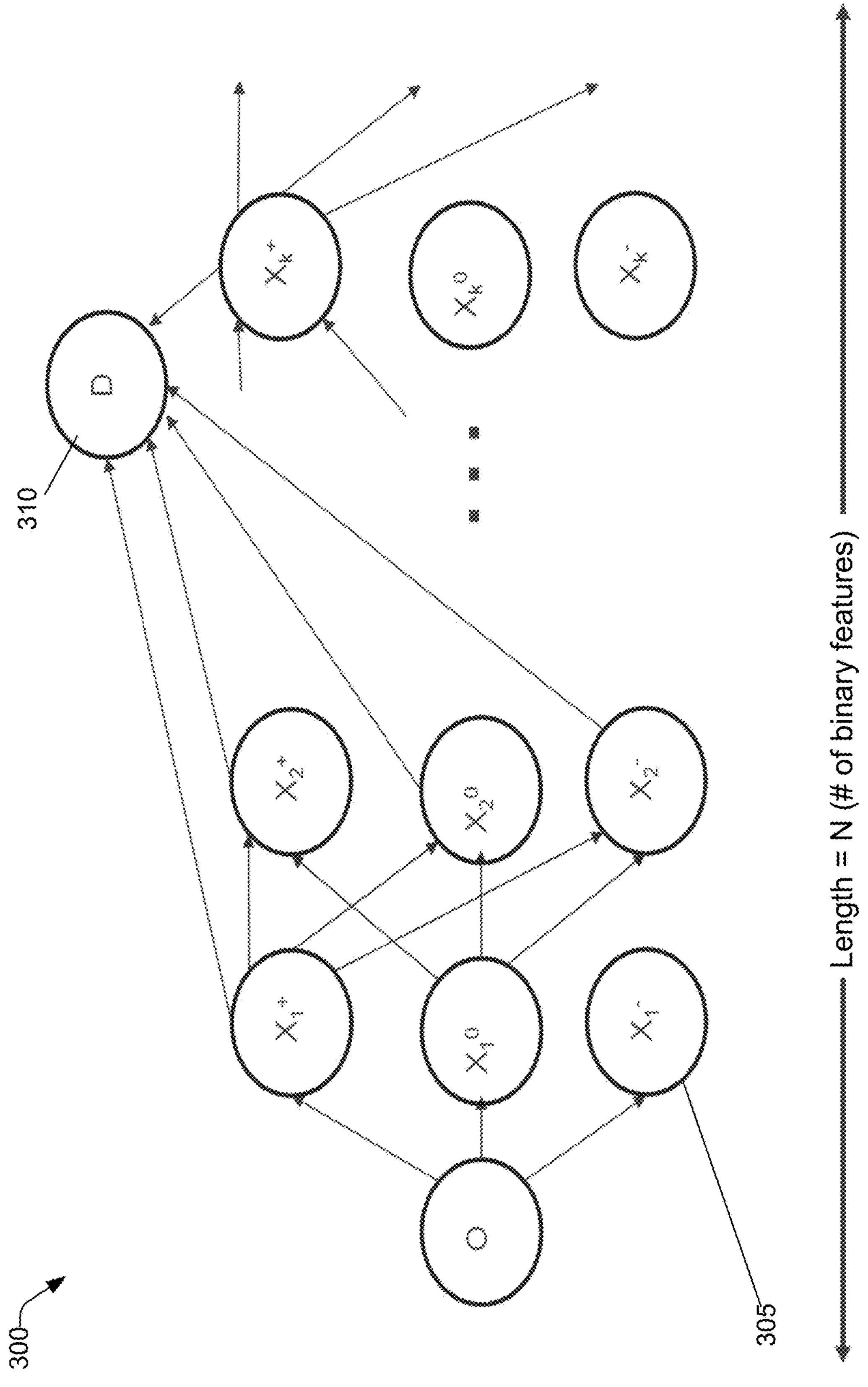
FIG. 3 illustrates a generic feature graph, consistent with an illustrative embodiment.

FIG. 3 illustrates a generic feature graphs 300, consistent with an illustrative embodiment. FIG. 3 is a simple digraph for given start $X_1$ 305. The length=N times a number of binary features. The "O" is the origin and the "D" is the destination. The node types include (in addition to O/D) true ($X_k$+), false ($X_k$−) and not present ($X_k$0). The constrained resources include the number of arcs in path less than r equal to D, and the number of transactions greater than $Node_{min}$.

Figure 4:
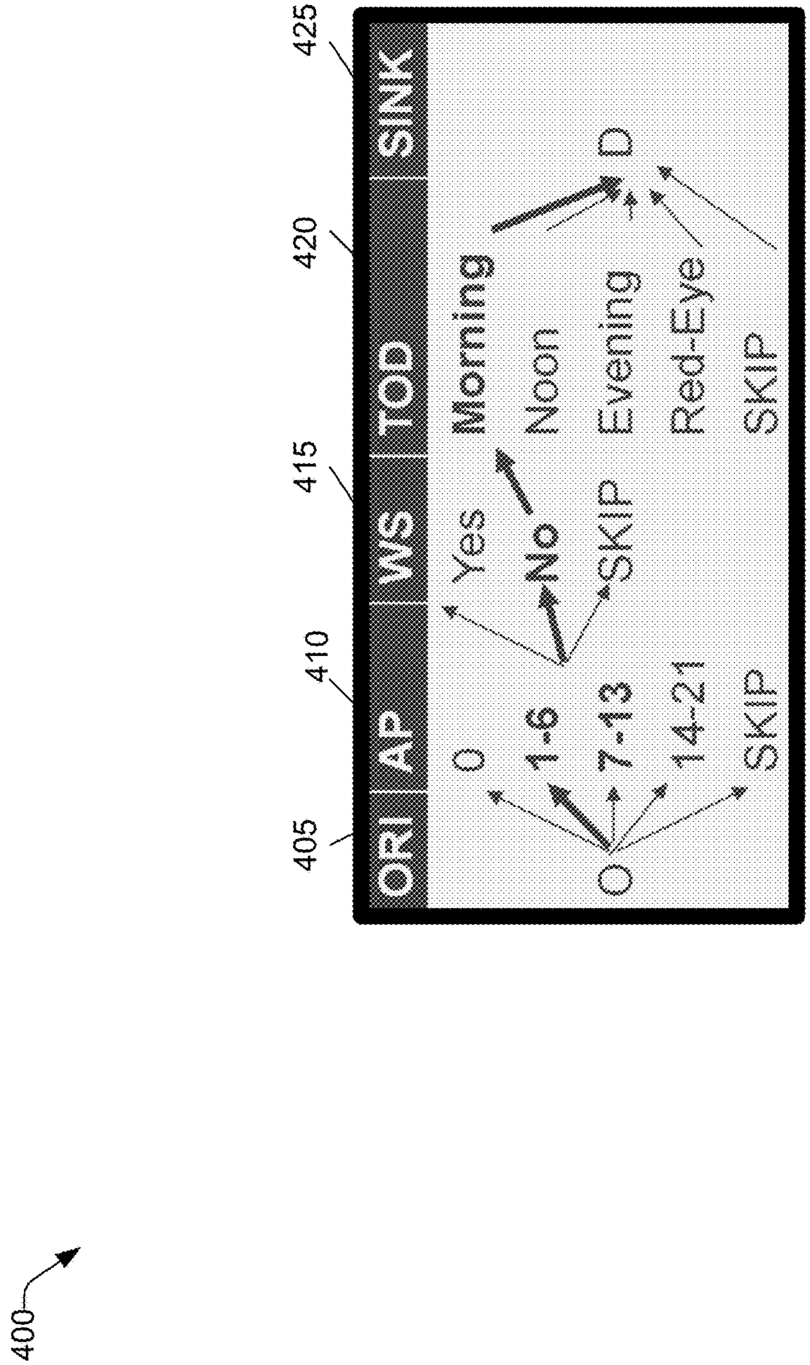
FIG. 4 is an illustration of a hierarchical sparse feature graph construction, consistent with an illustrative embodiment.

FIG. 4 is an illustration of a hierarchical sparse feature graph construction 400, consistent with an illustrative embodiment. The input includes transactions in the training data and a list of features sorted in order of importance suggested by the counterfactual estimate (see FIG. 2). Given a feature "f", a node is created for each distinct feature value, and the last note (level $L_{f\text{-}1}$) denotes a "SKIP node". The path passes thru "SKIP". The categories includes origin (ORI) 405 advance purchase (AP) 410, Weekend Stay (WS) 415, Time of Day (TOD) 420, and sink node 425.

Example Process

Figure 5:
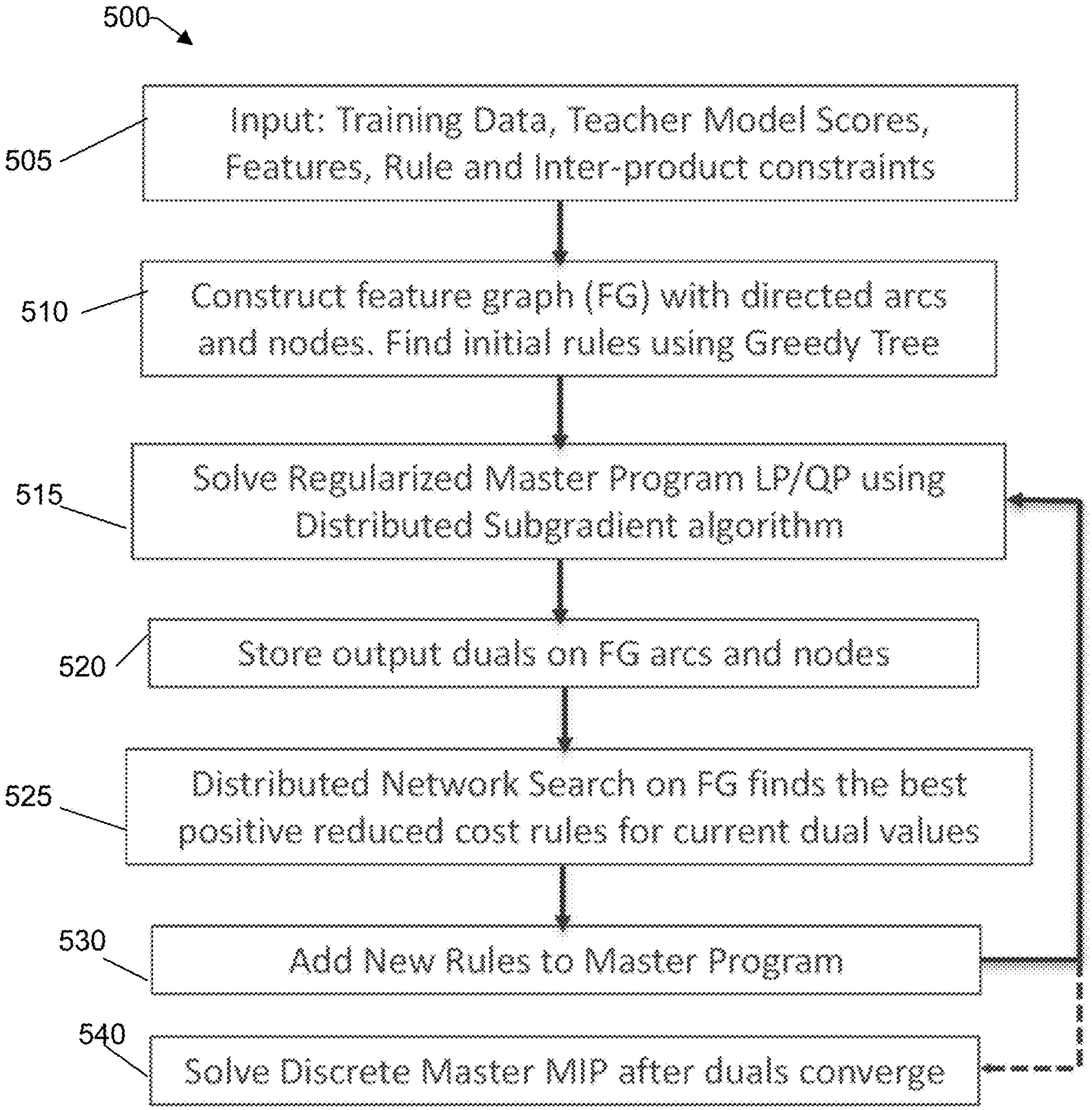
FIG. 5 is a flowchart illustrating a computer-implemented method of generating an Artificial Intelligence (AI) driven prescriptive policy and function execution, consistent with an illustrative embodiment.
Figure 6:
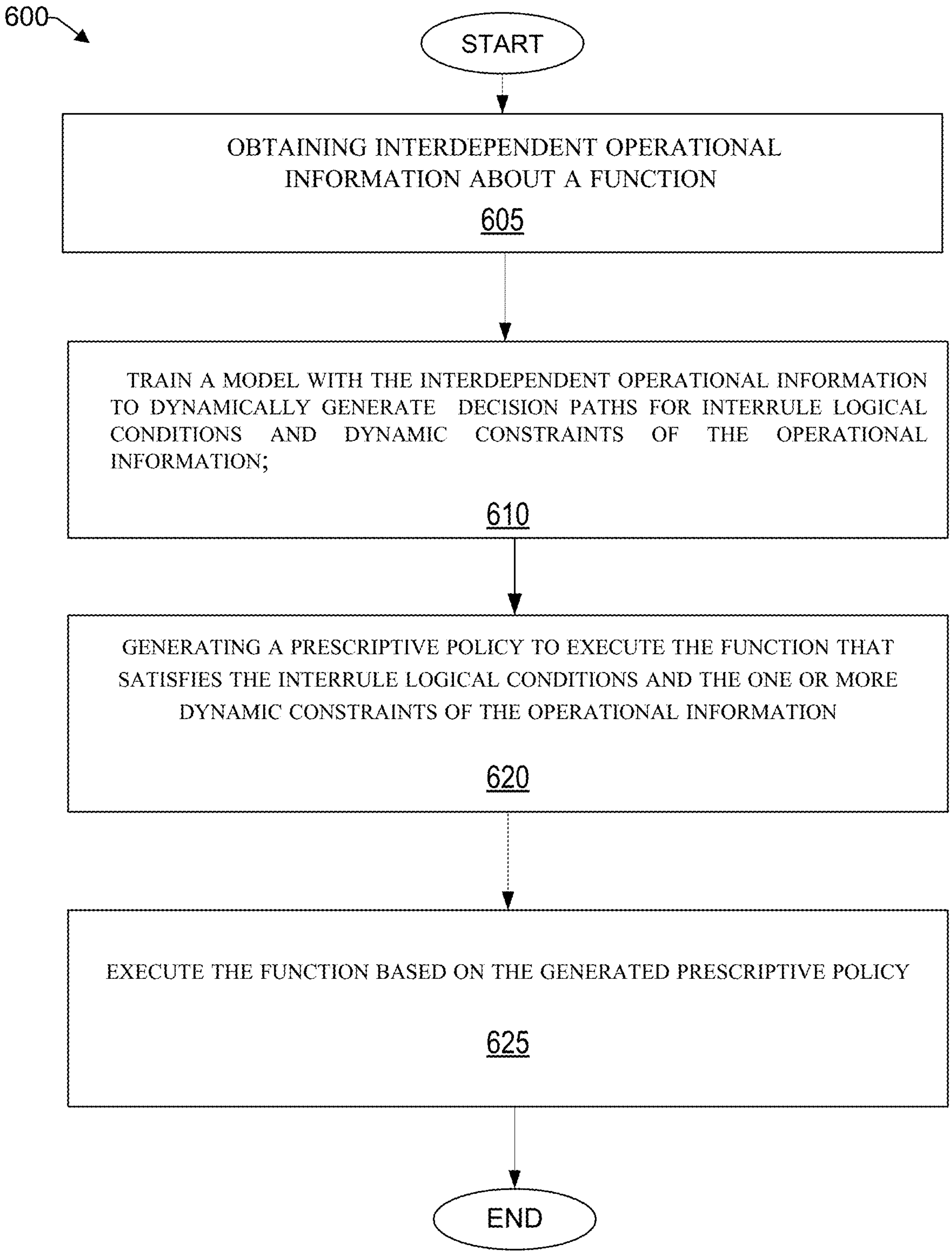
FIG. 6 is a flowchart illustrating another computer-implemented method of generating an (AI) driven prescriptive policy and function execution, consistent with an illustrative embodiment.

With the foregoing overview of the example architecture, it may be helpful now to consider a high-level discussion of an example process. To that end, FIG. 5 is a flowchart illustrating a computer-implemented method of generating an (AI) driven prescriptive policy and function execution, consistent with an illustrative embodiment. FIG. 6 is another computer-implemented method of generating an (AI) driven prescriptive policy and function execution, consistent with an illustrative embodiment.

FIGS. 5 and 6 are shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 505, there is an input of training data, teacher model scores, features, rule, and interproduct constraints. As discussed above, the teacher model is trained. The teacher model is then is used to train a student model.

At operation 510, a feature graph is constructed with directed arcs and nodes using a Greedy Tree. FIG. 4 shows an example feature graph construction.

At operation 515, a regularized master program LP/QP is solved using a distributed subgradient. Precomputed coefficients for each transaction are used.

At operation 520, the output duals on feature graph arcs and nodes are stored.

At operation 525, there is a distributed network search on the feature graph (FG) to find a best positive reduced cost rule for current dual values.

At operation 530, new rules can be added to the Master Program. The method then repeats the performance of operations 515-525. Alternatively, if there are no new rules added to the master program, then at operation 540 the method may solve the discrete Master mixed-integer program (MIP) Lagrangian duals converge. The method then solves for a discrete Master MIP.

FIG. 6 is a flowchart illustrating another method of generating an (AI) driven prescriptive policy and function execution, consistent with an illustrative embodiment.

At operation 605, interdependent operational information about a function is obtained. Such information may include constraints, cross-rules, global capacity information, etc.

At operation 610, a model is trained with the interdependent operational information to dynamically generate candidate decision paths from a group of all feasible decision paths for interrule logical conditions and dynamic constraints. The model may be a student model that is being trained using a teacher model, as discussed herein above.

At operation 620 a prescriptive policy is generated from the plurality of candidate decision paths to execute the function that satisfies to a threshold degree of confidence the interrule logical conditions and the one or more dynamic constraints of the operational information. With regard to the threshold degree of confidence, the satisfaction is probabilistic. In other words, actions that are constrained to maximally ensure that these new actions (perhaps not seen in historical data) will produce results that closely match what was predicted.

The prescriptive policy may be generated using a mixed-integer program and a dynamic column generation.

At 625, the function is executed based on the generated prescripted policy. For example, the constraints are observed when executing the function so that the rules are satisfied.

Example Particularly Configured Computer Hardware Platform

Figure 7:
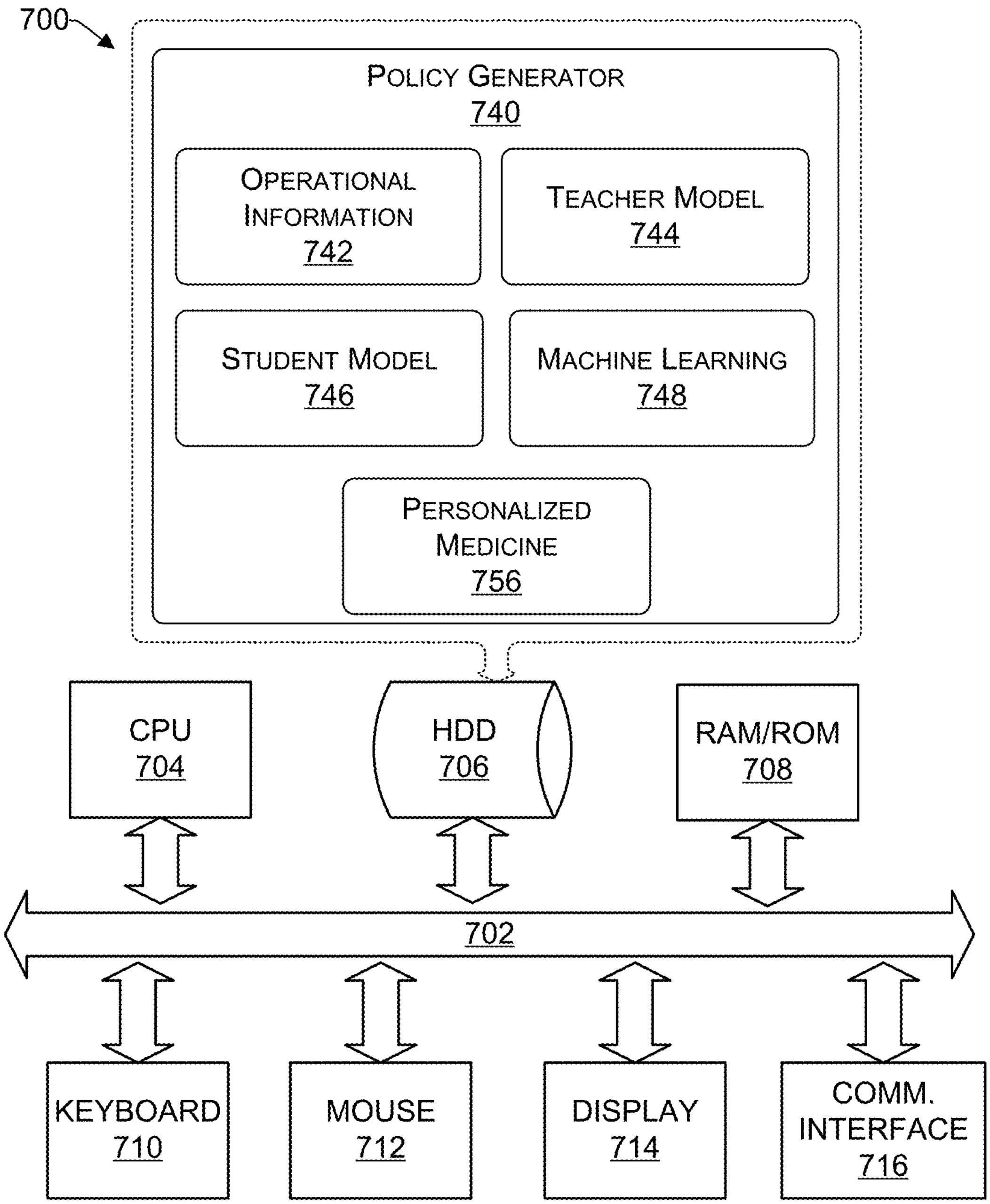
FIG. 7 is a functional block diagram illustration of a computer hardware platform, consistent with an illustrative embodiment.

FIG. 7 provides a functional block diagram illustration 700 of a computer hardware platform. In particular, FIG. 7 illustrates a particularly configured network or host computer platform 700, as may be used to implement the methods shown in FIG. 5 and FIG. 6.

The computer platform 700 may include a central processing unit (CPU) 704, a hard disk drive (HDD) 706, random access memory (RAM) and/or read-only memory (ROM) 708, a keyboard 710, a mouse 712, a display 714, and a communication interface 716, which are connected to a system bus 702. The HDD 706 can include data stores.

In one embodiment, the HDD 706 has capabilities that include storing a program that can execute various processes, such as machine learning, predictive modeling, classification, updating model parameters. The ML model generation module 740 is configured to generate a machine learning model based on at least one of the generated candidate machine learning pipelines.

With continued reference to FIG. 7, there are various modules shown as discrete components for ease of explanation. However, it is to be understood that the functionality of such modules and the quantity of the modules may be fewer or greater than shown. A policy generator 740 is configured to generate a prescriptive policy to generate decisions that satisfy attribute-combination, cross-rules, and global capacity constraints. An operational information module 742 provides the associated attribute combination, cross-rules, and global capacity constraints. A teacher model 744 is used in an illustrative embodiment is trained to predict counterfactual outcomes associated with different actions. A student model 746 is trained with the teacher model to determine a best policy with respect to a given objective. The student model can include a multiway-split tree (MST), wherein a node includes two or more children nodes.

A machine learning module 748 is configured to assist in a prescriptive policy generation. A personalized medicine module 756 is configured to generate the best treatment options for an individual patient. Success can be measured as a 5-year survival rate for patients with cancer/chronic diseases, or a recovery rate from a certain disease. It is to be understood that the subject matter of prescriptive decisions is not limited to the examples shown. For example, in a case where airline tickets are offered, there can be many constraints such as staying on a Saturday night, the capacity of the plane on a certain flight, the date and time before the flight departs, how many tickets have already been sold, are just a few of the interdependencies and constraints that can be taken into account prior to generating a prescriptive policy for executing a function.

Example Cloud Platform

As discussed above, functions relating prescriptive may include a cloud. It is to be understood that although this disclosure includes a detailed description of cloud computing as discussed herein below, the implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 8:
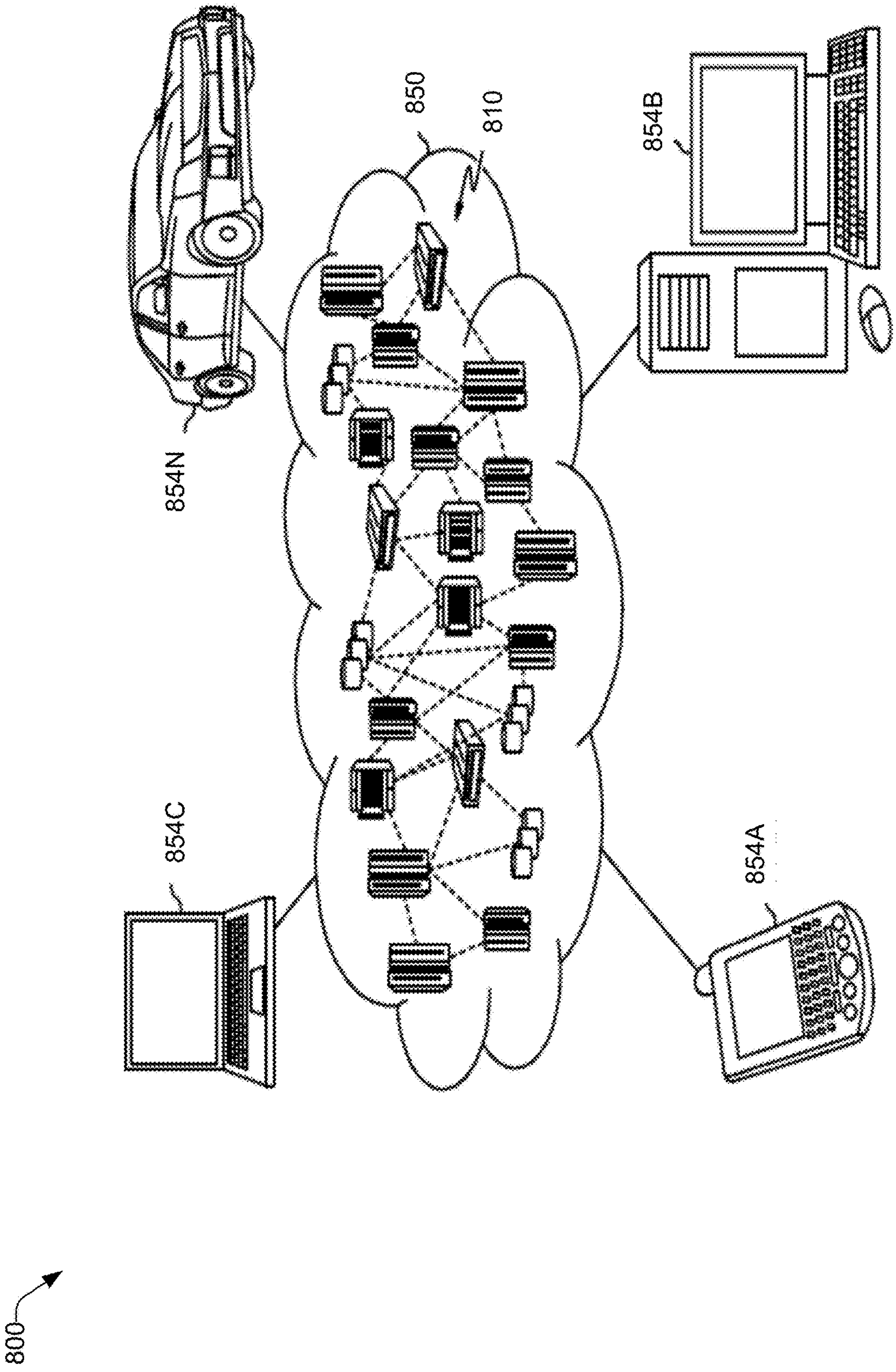
FIG. 8 depicts an illustrative cloud computing environment, consistent with an illustrative embodiment.

Referring now to FIG. 8, an illustrative cloud computing environment 800 utilizing cloud computing is depicted. As shown, cloud computing environment 800 includes cloud 850 having one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms, and/or software as services for which a cloud consumer does not need to maintain resources on a local computing device. It is understood that the types of computing devices 854A-N shown in FIG. 8 are intended to be illustrative only and that computing nodes 810 and cloud computing environment 800 can communicate with any type of computerized device over any type of network and/or network addressable connection (e.g., using a web browser).

Figure 9:
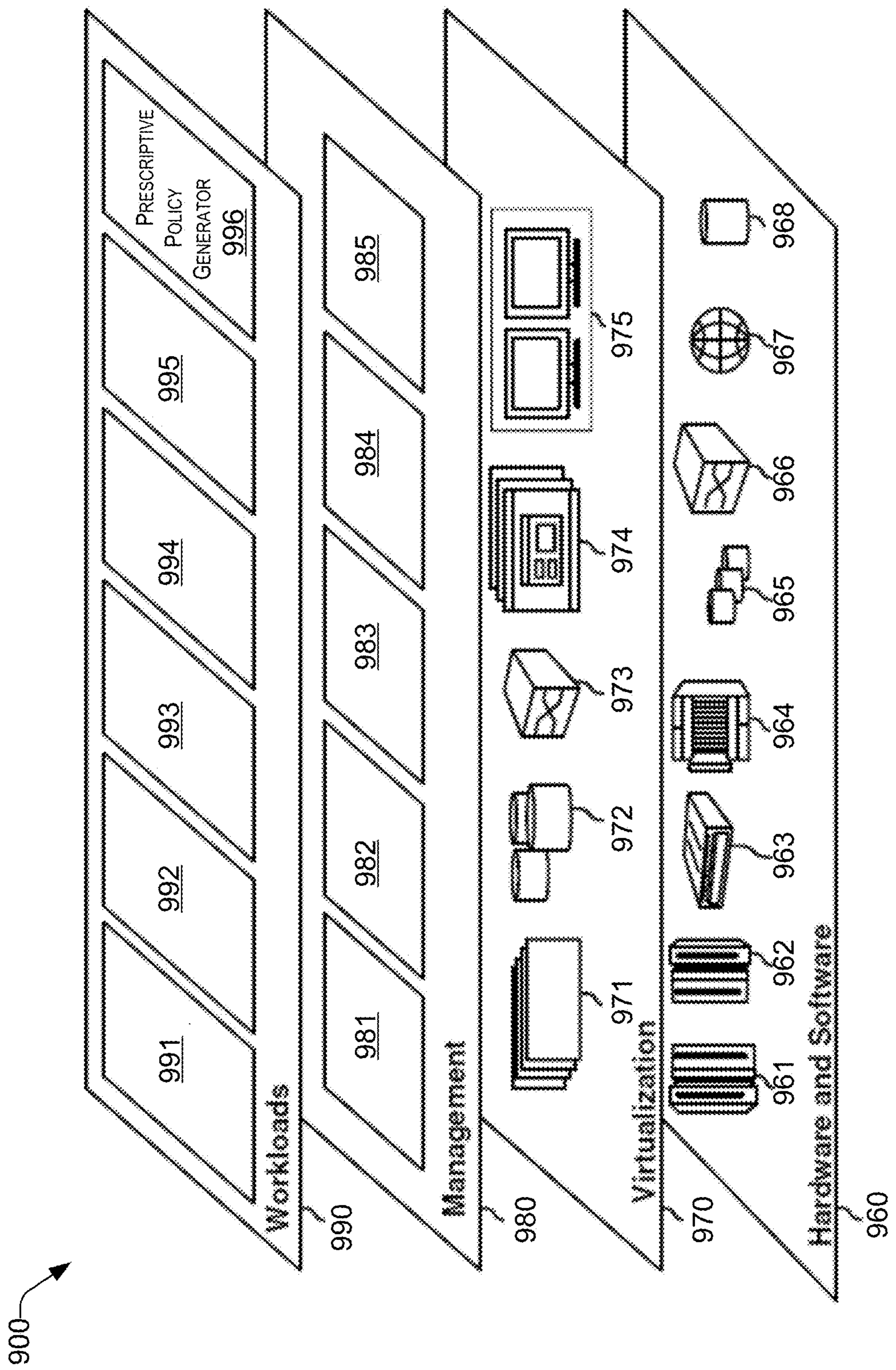
FIG. 9 depicts a set of functional abstraction layers provided by a cloud computing environment, consistent with an illustrative embodiment.

Referring now to FIG. 9, a set of functional abstraction layers 900 provided by cloud computing environment 900 (FIG. 9) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and prescriptive policy generation module 996 configured to generate optimal decisions that satisfy interrule logical conditions and dynamic global constraints, as discussed herein above.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of generating an Artificial Intelligence (AI) driven personalized medicine prescriptive policy and execution of a function, the computer-implemented method comprising:

training a teacher model to predict one or more counterfactual outcomes associated with different actions, wherein the teacher model generates scores indicative of the one or more counterfactual outcomes;

obtaining a sorted list of features and interdependent operational information about the function, wherein the sorted list of features is sorted based on the scores indicated by the one or more counterfactual outcomes;

training a student model, different from the teacher model, using the interdependent operational information and the sorted list of features to dynamically generate a plurality of candidate decision paths from a group of feasible decision paths for a plurality of interrule logical conditions and one or more dynamic constraints of the interdependent operational information, wherein the generation of the plurality of candidate decision paths comprises:

iteratively performing, by the student model, a distributed AI-guided search on the group of feasible decision paths to identify the plurality of candidate decision paths, wherein the plurality of candidate decision paths comprises a smaller number of decision paths than the group of feasible decision paths;

generating a personalized medicine prescriptive policy, from the plurality of candidate decision paths to execute the function, that satisfies to a threshold degree of confidence related to the interrule logical conditions and the one or more dynamic constraints of the interdependent operational information, wherein the generating of the personalized medicine prescriptive policy comprises:

determining that lagrangian duals converge for the plurality of candidate decision paths; and applying a mixed-integer program (MIP) formulation on the plurality of candidate decision paths based on the determining that the lagrangian duals converge for the plurality of candidate decision paths, wherein the applying of the MIP formulation reduces the plurality of candidate decision paths to generate the personalized medicine prescriptive policy; and executing the function based on the generated personalized medicine prescriptive policy.

2. The computer-implemented method of claim 1, wherein the training of the student model further comprises selectively combining one or more of the plurality of candidate decision paths to generate the personalized medicine prescriptive policy.

3. The computer-implemented method of claim 2, wherein the personalized medicine prescriptive policy includes interpretable prescriptive decisions that satisfy attribute-combination, cross-rules, and global capacity constraints.

4. The computer-implemented method of claim 2, wherein the generating of the personalized medicine prescriptive policy further comprises applying the MIP formulation to analyze the interdependent operational information and identify a particular policy via a dynamic column generation.

5. The computer-implemented method of claim 2, wherein the executing of the function provides a dosage recommendation of a medical treatment.

6. The computer-implemented method of claim 5, wherein the generating of the personalized medicine prescriptive policy is based in part on past patient responses to different treatment options.

7. The computer-implemented method of claim 4, wherein the teacher model comprises an opaque predictive counterfactual estimation model configured to predict a probability of success associated with the one or more counterfactual outcomes.

8. The computer-implemented method of claim 2, wherein the student model is trained with the teacher model to determine a best policy, from the plurality of candidate decision paths, with respect to a given objective.

9. The computer-implemented method of claim 2, wherein the student model comprises a multiway-split tree (MST); and a node of the MST includes two or more children nodes.

10. The computer-implemented method of claim 2, further comprising mapping each prescribed rule of a plurality of prescribed rules associated with the plurality of candidate decision paths to a distinct and independent path in a graph.

11. A computing device configured to generate an Artificial Intelligence (AI) driven personalized medicine prescriptive policy and execute a function, the computing device comprising:

a processor; and a memory coupled to the processor, the memory storing instructions to cause the processor to perform operations comprising:

training a teacher model to predict one or more counterfactual outcomes associated with different actions, wherein the teacher model generates scores indicative of the one or more counterfactual outcomes;

obtaining a sorted list of features and interdependent operational information about the function, wherein the sorted list of features is sorted based on the scores indicated by the one or more counterfactual outcomes;

training a student model, different from the teacher model, using the interdependent operational information and the sorted list of features to dynamically generate a plurality of candidate decision paths from a group of feasible decision paths for a plurality of interrule logical conditions and one or more dynamic constraints of the interdependent operational information, wherein the generation of the plurality of candidate decision paths comprises:

iteratively performing, by the student model, a distributed AI-guided search on the group of feasible decision paths to identify the plurality of candidate decision paths, wherein the plurality of candidate decision paths comprises a smaller number of decision paths than the group of feasible decision paths;

generating a personalized medicine prescriptive policy, selected from the plurality of candidate decision paths to execute the function, that satisfies to a threshold degree of confidence related to the inter-rule logical conditions and the one or more dynamic constraints of the interdependent operational information, wherein the generating of the personalized medicine prescriptive policy comprises:

determining that lagrangian duals converge for the plurality of candidate decision paths; and applying a mixed-integer program (MIP) formulation on the plurality of candidate decision paths based on the determining that the lagrangian duals converge for the plurality of candidate decision paths, wherein the applying of the MIP formulation reduces the plurality of candidate decision paths to generate the personalized medicine prescriptive policy; and executing the function based on the generated personalized medicine prescriptive policy.

12. The computing device according to claim 11, wherein the operations further comprise selectively combining at least some of the plurality of candidate decision paths to generate the personalized medicine prescriptive policy.

13. The computing device according to claim 11, wherein the operations further comprise including, in the personalized medicine prescriptive policy, interpretable prescriptive decisions that satisfy attribute-combination, cross-rules, and global capacity constraints.

14. The computing device according to claim 11, wherein the operations further comprise:

applying the MIP formulation to analyze the interdependent operational information; and identifying a particular policy from the plurality of candidate decision paths, via a dynamic column generation.

15. The computing device according to claim 11, wherein the executing of the function provides a dosage recommendation of a medical treatment.

16. The computing device according to claim 11, wherein the student model is trained with the teacher model to determine a best policy, from the plurality of candidate decision paths, with respect to a given objective, wherein the student model comprises a multiway-split tree (MST); and a node of the MST includes two or more children nodes.

17. The computing device according to claim 11, wherein the operations further comprise mapping each prescribed rule of a plurality of prescribed rules associated with the plurality of candidate decision paths to a distinct and independent path in a graph.

18. A non-transitory computer readable storage medium tangibly embodying a computer readable program code having computer readable instructions that, when executed, causes a computer device to execute operations for generating an Artificial Intelligence (AI) driven personalized medicine prescriptive policy and execute a function, the operations comprising:

training a teacher model to predict one or more counterfactual outcomes associated with different actions, wherein the teacher model generates scores indicative of the one or more counterfactual outcomes;

obtaining a sorted list of features and interdependent operational information about the function, wherein the sorted list of features is sorted based on the scores indicated by the one or more counterfactual outcomes;

training a student model, different from the teacher mode, using the interdependent operational information and the sorted list of features to dynamically generate a plurality of candidate decision paths from a group of feasible decision paths for a plurality of interrule logical conditions and one or more dynamic constraints of the interdependent operational information, wherein the generation of the plurality of candidate decision paths comprises:

iteratively performing, by the student model, a distributed AI-guided search on the group of feasible decision paths to identify the plurality of candidate decision paths, wherein the plurality of candidate decision paths comprises a smaller number of decision paths than the group of feasible decision paths;

generating a personalized medicine prescriptive policy, from the plurality of candidate decision paths to execute the function, that satisfies to a threshold degree of confidence related to the interrule logical conditions and the one or more dynamic constraints of the interdependent operational information, wherein the generating of the personalized medicine prescriptive policy comprises:

determining that lagrangian duals converge for the plurality of candidate decision paths; and applying a mixed-integer program (MIP) formulation on the plurality of candidate decision paths based on the determining that the lagrangian duals converge for the plurality of candidate decision paths, wherein the applying of the MIP formulation reduces the plurality of candidate decision paths to generate the personalized medicine prescriptive policy; and executing the function based on the generated personalized medicine prescriptive policy.

* * * * *